(12) United States Patent
Louet et al.

(10) Patent No.: US 9,776,707 B2
(45) Date of Patent: Oct. 3, 2017

(54) AIRCRAFT TURBOPROP ENGINE COMPRISING TWO COAXIAL PROPELLERS

(71) Applicant: SNECMA, Paris (FR)

(72) Inventors: Anthony Pascal Eloi Louet, Alfortville (FR); Clement Marcel Maurice Dejeu, Fontenailles (FR); Jonathan Evert Vlastuin, Charenton Le Pont (FR)

(73) Assignee: SNECMA, Paris (FR)

( * ) Notice: Subject to any disclaimer, the term of this patent is extended or adjusted under 35 U.S.C. 154(b) by 517 days.

(21) Appl. No.: 14/723,990

(22) Filed: May 28, 2015

(65) Prior Publication Data
US 2016/0159459 A1 Jun. 9, 2016

(30) Foreign Application Priority Data
May 28, 2014 (FR) ..................................... 14 54876

(51) Int. Cl.
| F01D 1/26 | (2006.01) |
| F01D 5/14 | (2006.01) |
| B64C 11/18 | (2006.01) |
| F02K 3/072 | (2006.01) |
| B64C 11/48 | (2006.01) |

(52) U.S. Cl.
CPC ............. B64C 11/18 (2013.01); B64C 11/48 (2013.01); F01D 1/26 (2013.01); F01D 5/141 (2013.01);
(Continued)

(58) Field of Classification Search
CPC ........... F01D 1/26; F01D 5/141; B64C 11/18; B64C 11/48; F05D 2220/323;
(Continued)

(56) References Cited

U.S. PATENT DOCUMENTS

| 5,513,952 A * | 5/1996 | Mizuta | ................... F01D 5/143 415/182.1 |
| 6,338,609 B1 * | 1/2002 | Decker | ................... F01D 5/141 415/173.1 |

(Continued)

FOREIGN PATENT DOCUMENTS

| FR | 2 979 391 | 3/2013 |
| FR | 2 992 688 | 1/2014 |

OTHER PUBLICATIONS

French Preliminary Search Report issued Feb. 23, 2015 in French Application 14 54876, filed on May 28, 2014 (with English Translation of Categories of Cited Documents).

*Primary Examiner* — Igor Kershteyn
(74) *Attorney, Agent, or Firm* — Oblon, McClelland, Maier & Neustadt, L.L.P.

(57) ABSTRACT

The invention relates to an aircraft turboprop engine having two unducted propellers, coaxial about a rotation axis (LL), respectively upstream (12) and downstream (14'), each propeller comprising an annular row of blades, the blades of the downstream propeller (14') each having a truncated head and each comprising a leading edge (20') and a trailing edge (22'), the radially external ends (A2, B1) of which are distant from each other and are connected by a terminal edge (21'), characterised in that the terminal edge (21') of each blade of the downstream propeller (14') has, at at least two points, tangents in a meridian plane having different slopes, the upstream end (A) of the terminal edge defining a maximum radial dimension (R2) of the blade and its downstream end (B1) defining a minimum radial dimension (R3) of the terminal edge.

11 Claims, 1 Drawing Sheet

(52) U.S. Cl.
CPC ........ *F02K 3/072* (2013.01); *F05D 2220/323* (2013.01); *F05D 2230/10* (2013.01); *F05D 2240/307* (2013.01); *F05D 2260/96* (2013.01); *Y02T 50/673* (2013.01)

(58) Field of Classification Search
CPC ........... F05D 2230/10; F05D 2240/307; F05D 2260/96; Y02T 50/673
See application file for complete search history.

(56) References Cited

U.S. PATENT DOCUMENTS

| | | | |
|---|---|---|---|
| 6,358,003 B2* | 3/2002 | Schlechtriem | F01D 5/141 415/119 |
| 7,476,086 B2* | 1/2009 | Wadia | F01D 5/141 416/223 R |
| 8,317,482 B2* | 11/2012 | Bois | F01D 5/141 416/228 |
| 2004/0028526 A1* | 2/2004 | Teramura | F01D 5/143 415/220 |
| 2011/0189020 A1* | 8/2011 | Aulich | F01D 5/143 416/182 |
| 2013/0149108 A1* | 6/2013 | Webster | F01D 5/20 415/119 |
| 2013/0156583 A1 | 6/2013 | Wood | |
| 2013/0164140 A1 | 6/2013 | Shah et al. | |
| 2013/0336761 A1* | 12/2013 | Evans | F01D 21/045 415/9 |
| 2013/0343892 A1* | 12/2013 | Stretton | F02K 3/072 416/201 R |

* cited by examiner

AIRCRAFT TURBOPROP ENGINE COMPRISING TWO COAXIAL PROPELLERS

TECHNICAL FIELD

The present invention relates to an aircraft turboprop engine comprising two unducted coaxial propellers, respectively upstream and downstream. This turboprop engine is of the open rotor or unducted double fan type.

PRIOR ART

A turboprop engine of this type comprises two propellers each comprising an annular row of blades. The two propellers are in general contra-rotating, in that they are designed so that they cause the flow passing through them to rotate in opposite directions. In general, the two propellers are rotated by a power turbine of the turboprop engine but the downstream propeller may be fixed, as is the case in a USF (unducted single fan) engine.

This type of turboprop engine is particularly advantageous in terms of performance. However, a major drawback of this type of turboprop engine is the noise that it generates, this noise being in particular caused by the interaction of the slipstream and the tip vortex generated by the coiling of the flow lines at the tip (the head edge) of the blades of the upstream propeller with the blades of the downstream propeller.

One solution has already been proposed for reducing the noise issuing from the interaction between the tip vortex and downstream propeller, consisting in reducing the outside diameter of the downstream propeller to prevent the aforementioned vortex impacting on the downstream propeller, causing it to pass outside it. This solution, referred to as "clipping", is however not satisfactory from an aerodynamic point of view since the load on the rotor increases (quadratically), which is detrimental to efficiency. Moreover, in order to distribute the additional loading, an increase in the number of blades on the downstream propeller, or the chords of its blades, is necessary, which, from the point of view of mass or bulk, is not favourable.

One solution to this additional problem could, during design, consist in redistributing the load on the upstream propeller. This solution would however not be satisfactory since it would significantly increase the energy conveyed by the tip vortex. From a physical point of view, some of the aerodynamic losses escape in the form of a vortex layer with an intensity proportional to the traction demanded of the propeller rotor. The higher the upstream load, the higher the energy conveyed by this vortex layer. The impact of this layer on a solid surface gives rise to most of the aforementioned noise.

The aim of the present invention is in particular to afford a simple, effective and economical solution to the aforementioned problem.

DISCLOSURE OF THE INVENTION

To this end, the invention relates to an aircraft turboprop engine comprising two unducted propellers, coaxial about a rotation axis, respectively upstream and downstream, each propeller comprising an annular row of blades, the blades of the downstream propeller each having a truncated head and each comprising a leading edge and a trailing edge, the radially external ends of which are distant from each other and are connected by a terminal edge. Here the terminal edge of each blade of the downstream propeller has, at at least two points, tangents in a meridian plane having different slopes, the upstream end of the terminal edge defining a maximum radial dimension of the blade and its downstream end defining a minimum radial dimension of said terminal edge, and the turboprop engine is characterised in that the downstream propeller is situated inside a cone converging towards the downstream end, which meets the terminal edge of the blades of the upstream propeller and the radial dimension of which in the transverse plane passing through the downstream end of the terminal edge is less than the maximum radial dimension of the blades of the downstream propeller.

In the present application, truncated head of a blade means the fact that the leading edge and the trailing edge of the blade do not join at the radial end of the blade and curve continuously towards each other. In this case, there are, close to the radial end of the blade, which will also be referred to as the head of the blade, radially external ends of the leading edge and the trailing edge, at which there is a break in slope, for the leading edge and the trailing edge, with a terminal edge that joins the two. In the prior art, this terminal edge may be substantially rectilinear and corresponds to what was previously referred to as the head edge or the tip.

According to the invention, the terminal edge is not rectilinear since it starts upstream so as to follow substantially the shape of a blade that meets the tip vortices of the upstream propeller and because it ends with a convergent part, joining the downstream end with a minimum radial dimension, in order to pass under these vortex.

The aforementioned vortex structures, generated by the radially external ends of the blades of the upstream propeller, in general have a linear path along the longitudinal axis of the turboprop engine, substantially contracting towards the rotation axis and directed from the upstream propeller towards the downstream propeller. These paths are therefore situated substantially on a convergent cone between the upstream propeller and the downstream propeller.

Path analyses issuing from numerical and experimental results, have also demonstrated that the tip vortex of the upstream propeller interacts with the radially external ends of the blades of the downstream propeller, at the head of these blades.

In the prior art, the blades of the downstream propeller have their leading and trailing edges extending radially as far as a substantially identical radial head dimension. The downstream part of the terminal edge interacts with the tip vortex of the head of the blades of the upstream propeller, whereas the leading edge may be situated distant from it.

Introducing a downstream convergent part of the terminal edge makes it possible to eliminate only the part of the blade that is interacting with the tip vortex. This therefore makes it possible to remove the minimum wetted surface of the blades of the downstream propeller and thus, for a given operating speed, to reduce the interaction noise for an efficiency that is at least equal to that of the prior art.

Moreover, a downstream propeller configured so that it is possible to find a cone passing through the terminal edge of the upstream propeller and which truncates the terminal edge of the downstream propeller as indicated above, makes it possible to follow as closely as possible the vortex cone for a given engine speed and thus optimises the aeroacoustic efficiency at this speed.

Preferably, the radial distance from the terminal edge to the rotation axis is in the form of a concave function of the position along the rotation axis. In other words, the slope of the terminal edge may start at the upstream end, substantially parallel to the rotation axis, so as to curve towards the downstream end so as to converge towards the rotation axis and to pass radially inside the cone of the tip vortex of the upstream propeller. With this way of intersecting the terminal edge in a bevel towards the downstream end, it is possible to preserve the maximum amount of useful surface of the blades of the upstream propeller at the maximum radius, as long as the terminal edge does not approach too close to the tip vortex of the upstream propeller.

Preferably, the terminal edge comprises a substantially rectilinear upstream part defining the maximum radial dimension of the blade.

Although the length of this rectilinear part may be negligible, it may preferably be at least 2%, more preferentially at least 5%, and even more preferentially at least 10%, of the length of a reference chord of the blade at the downstream end of the terminal edge.

Preferably, the terminal edge comprises a downstream part inclined from upstream to downstream radially towards the inside, the axial extension of this downstream part being at least equal to 10% of the axial extension of the chord of the blade at the downstream end of the terminal edge.

In the present application, the chord of a propeller blade means the segment connecting the points on the leading edge and the trailing edge situated at the same radial dimension. The length of the chord of a blade varies along its radial dimension. The reference chord is measured at the downstream end of the terminal edge, that is to say substantially at the external end of the trailing edge. Its axial extension corresponds to the projection of the chord in a meridian plane.

According to various variants of these embodiments of the invention, which can be taken together or separately:
- the radial extension of the terminal edge is no more than 20% of the maximum radial dimension of the blade;
- said downstream part of the terminal edge comprises at least one portion, and preferably a plurality of successive portions with a rounded shape and having their centres of curvature on the same side with respect to a plane substantially tangent to the downstream part of the terminal edge, the portions being able to have their radii of curvature that decrease going from upstream to downstream;
- the trailing edge and/or the leading edge of each blade of the downstream propeller extends radially towards the outside while being inclined from upstream to downstream, at least close to the terminal edge.

The invention also relates to a method for producing a downstream propeller of an aircraft turboprop engine according to any of the preceding claims, characterised in that it comprises:
- a step consisting in designing blades for a reference downstream propeller, each blade having a truncated head and comprising a leading edge and a trailing edge, the radially external ends of which are distant from each other and are connected by a substantially rectilinear terminal edge, having a radial dimension substantially equal to the maximum radial dimension of the blades of the downstream propeller to be produced;
- a step of trimming the downstream and radially external end of each of said blades for a reference downstream propeller.

BRIEF DESCRIPTION OF THE DRAWINGS

The present invention will be better understood and other details, features and advantages of the present invention will emerge more clearly from a reading of the following description, given by way of a non-limiting example and with reference to the accompanying drawings, in which.

DESCRIPTION OF AN EMBODIMENT

Figure 1:
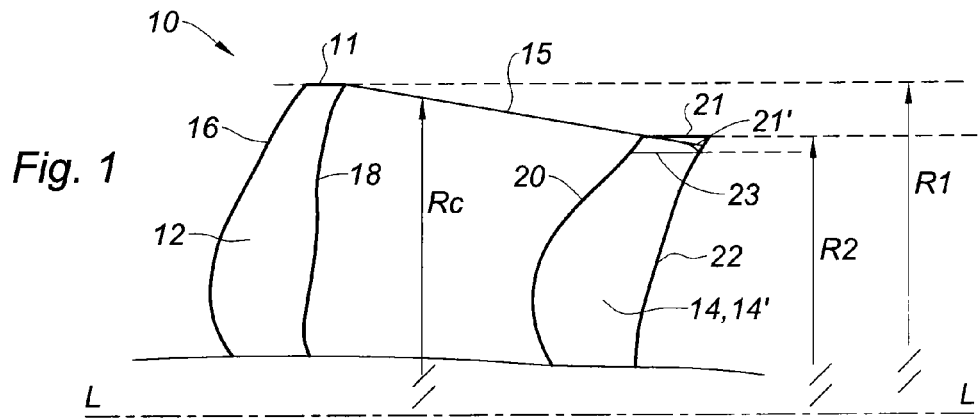
FIG. 1 is a highly schematic half view in meridian section of a turboprop engine with a pair of contra-rotating propellers.

By way of example, FIG. 1 depicts highly schematically a turboprop engine 10 of the open rotor or unducted fan type, comprising two unducted and contra-rotating coaxial propellers, respectively upstream 12 and downstream 14, rotating about an axis LL and each formed by an annular row of blades.

This is here a particular non-limitative example embodiment. In the case of a USF engine, the downstream propeller 14 would be fixed.

The upstream propeller 10 comprises an annular row of blades that here each have a rear deflection, that is to say they are curved towards the rear or towards the downstream end of the turboprop engine (upstream and downstream referring to the direction of flow of the gases in the turboprop engine, which is directed from left to right on the drawing).

Each blade of the upstream propeller 12 typically comprises a leading edge 16 and a trailing edge 18, the edges 16, 18 here extending from upstream to downstream radially towards the outside, with respect to the longitudinal axis LL of the turboprop engine.

The leading edge 16 and the trailing edge 18 of the blades of the upstream propeller 12 generally stop substantially at the same maximum radial dimension R1. A terminal edge 11, radially delimiting the blades of the upstream propeller 12, connects the radially external ends of the leading edge 16 and of the trailing edge 18.

The blades of the upstream propeller 12 generate a slipstream and a tip vortex. The tip vortex starts substantially from the downstream end of the terminal edge 11 of the blades and has a path 15 that is substantially rectilinear along the axis LL and, when the blades rotate, sweeps a surface that has substantially the shape of a cone, the apex of which is oriented downstream as far as the downstream propeller 14. The radial dimension Rc of this cone decreases from upstream to downstream along the axis LL.

Figure 2:
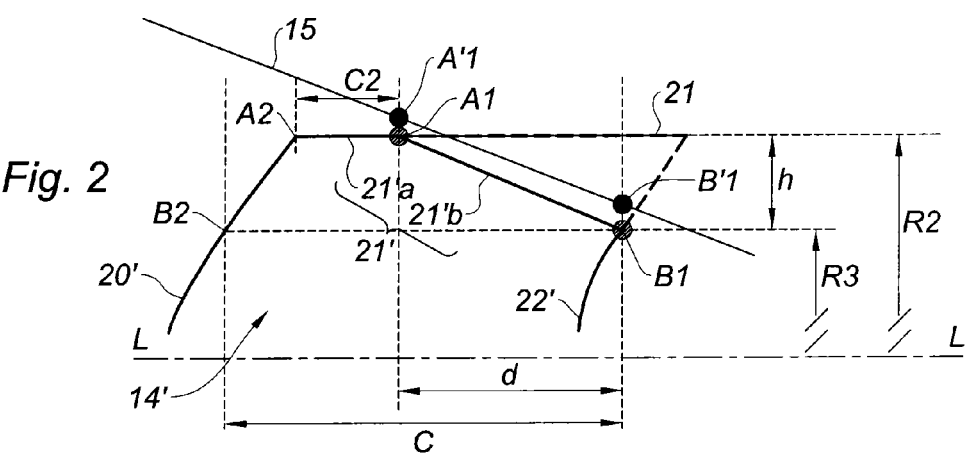
FIG. 2 depicts schematically an orthoradial projection of the radial end of a downstream propeller blade according to the invention in a meridian plane.

With reference to FIGS. 1 and 2, in the prior art, the downstream propeller 14 comprises an annular row of blades, as with the upstream propeller 12, the leading edge 20 and the trailing edge 22 of which generally stop substantially at the same maximum radial dimension R2.

In the example depicted in the drawings, the blades of the downstream propeller 14 each have a rear deflection, that is to say they are also curved towards the downstream end. The leading 20 and trailing 22 edges of the blades of the downstream propeller 14 extend from upstream to downstream radially towards the outside. Cases can on the other hand be envisaged where the design of the downstream propeller results in different developments of the leading edge and/or of the trailing edge (blades without deflection for example).

In the example of the prior art presented, a terminal edge 21 can be defined, depicted in dashed lines, said terminal edge connecting the radial end of the leading edge 20 to the radial end of the trailing edge 22. In this case, the terminal edge 21 has a substantially rectilinear general shape parallel to the axis LL, situated at a distance from this axis LL equal to the maximum radial dimension R2 of the downstream propeller 14, and with an axial extension equal to the chord for the maximum radial dimension R2.

The blade shape according to the prior art and optimised mainly for the overall efficiency of the turboprop engine can be defined by a stack of profiles to a maximum radial dimension. The chord of the profile at the radial end of the blades thus defined is generally non-zero and corresponds to a blade with a truncated head.

Generally, the blades of this propeller 14 have a maximum radial dimension such that their terminal edge 21 meets the cone of the path 15 of the upstream tip vortex, or is even situated entirely outside said cone. In this case, the interaction of the end of the blades of the downstream propeller 14 with said tip vortex constitutes a significant source of noise.

Clipping consists in reducing the maximum radial dimension R2 of this downstream propeller 14 under the path 15 of the upstream tip vortex in order to prevent this vortex impacting the blades of the downstream propeller 14. In this case, with reference to FIG. 1, the blades have substantially the same shape as those of a downstream propeller 14 previously designed to pass through this path 15, as far as a terminal edge 23 parallel to the previous terminal edge 21 but having a smaller radial dimension, so that it is situated entirely within the cone followed by the path 15 of the upstream tip vortex.

The present invention affords another solution to the problem of noise nuisance mentioned above by means of the "trimming" of the trailing edge 22 at the head of the blades of the downstream propeller 14 without significantly increasing the clipping.

By virtue of the invention, it is possible to increase the maximum radial dimension R2 of a downstream propeller 14' according to the invention, so that the leading edge of the blades approaches that of the cone of the path 15 of the tip vortex of the upstream propeller 12.

A method for producing the blades of a downstream propeller 14' in a turboprop engine according to the invention may commence with the design of a blade shape for a downstream propeller 14 according to the prior art previously introduced. This propeller 14 serves as a reference downstream propeller for the method for producing the downstream propeller 14' according to the invention.

Generally, the angle of the cone followed by the path 15 of the upstream tip vortices varies with the operating speed of the turboprop engine. The production method is therefore defined with respect to a given operating speed for which the acoustic performance must be optimised as a priority.

In a first variant, the reference downstream propeller 14 has a maximum radial dimension R2 such that the leading edge 20 of its blades remains inside said cone of the path 15 of the upstream tip vortex but the terminal edge 21 of the blades passes through said cone.

In the example presented in FIG. 2, the leading edge 20' of the blade of the downstream propeller 14' according to the invention therefore ends at a point A2 having the maximum radial dimension R2, corresponding to the maximum radial dimension of the shape of the blades of the reference downstream propeller 14.

The blades of the downstream propeller 14' of the turboprop engine according to the invention, depicted in continuous lines in FIGS. 1 and 2, are obtained by keeping a shape similar to the shape of the blades of the reference downstream propeller 14 as far as a radial dimension R3, less than the maximum radial dimension R2, which defines a radial end B1 for the trailing edge 22' of the blade according to the invention. This radial end B1 of the trailing edge 22' is situated below the cone of the path 15 of the tip vortex of the upstream propeller 12.

In other words, the shape of the blades of the propeller 14' according to the invention is substantially the same as that of the blades of the reference propeller 14 as far as the radial dimension R3 delimiting the radial end of the new trailing edge 22'. In a variant, it can be envisaged optimising the whole shape of the blades once a new terminal edge for the propeller 14' has been defined according to the steps described below.

With reference to FIG. 2, the downstream propeller 14' is then produced by using the same blade shapes as for the initially optimised downstream propeller 14 and by removing material for the radial dimensions greater than the radial dimension R3 of the radial end B1 of the new trailing edge 22', starting from this end B1 obliquely as far as an upstream end A1 situated on the terminal edge 21 of the reference propeller 14. This upstream end A1 is positioned so as to be close to the cone of the path 15 of the upstream tip vortex. Material is removed so that the whole of each blade of the propeller 14' is situated inside said cone.

With reference to FIG. 2, the leading edge 20' of a blade thus obtained is the same as the leading edge 20 of the blade of the reference propeller 14. It extends beyond the point B2 with the same radial dimension R3 as the radial end B1 of the trailing edge 22', in order to reach its own radial end A2 at the maximum radial dimension R2 of the blade, upstream of the radial end B1 of the trailing edge 22'.

This operation therefore creates a new terminal edge 21' connecting the leading edge 20' to the trailing edge 22', here formed by:
  a first part 21'a substantially rectilinear in the axial direction, which has essentially the same shape as that of the terminal edge 21 of the reference propeller 14 between its upstream end, corresponding to the radial end A2 of the leading edge 20', and the end A1 where the radial dimension begins to decrease; this first part 21'a is therefore here substantially parallel to the axis LL;
  a downstream convergent part 21'b between the end A1, situated substantially at the maximum radial dimension R2 of the downstream propeller 14', and its downstream end of the radial dimension R3, corresponding to the radial end B1 of the trailing edge 20'.

A blade of the new propeller 14' according to the invention therefore also has substantially the same shape as a blade of the reference propeller 14 above the radial dimension R3 of the downstream end B1 of the terminal edge 21', as far as close to this terminal edge 21' where the material is removed in order to stop the extension of the blade.

In particular, material can be removed close to the convergent part 21'b of the terminal edge, so that the faces of the blade join on a trailing edge line in order to prevent base flow effects.

The blades of the propeller 14' according to the invention can be produced directly from the shape thus defined or machined from blades of the reference helix that have previously been produced.

According to the invention, the shape of the new terminal edge 21' of the blades of the downstream propeller 14' is defined so that its downstream convergent part 21'b is situated as close as possible to the cone of the path 15 of the vortex, so as to remove as little wetted surface as possible.

The radial dimension R3 of the point B1, where the terminal edge 21' and the trailing edge 22' are connected, is here the maximum radial dimension of the non-modified part of the reference blade 14 in order to obtain the modified blade 14'. The reference chord of the modified blade 14' connects the points B2, B1 of the leading edge and of the trailing edge corresponding to this radial dimension R3.

Figure 3:
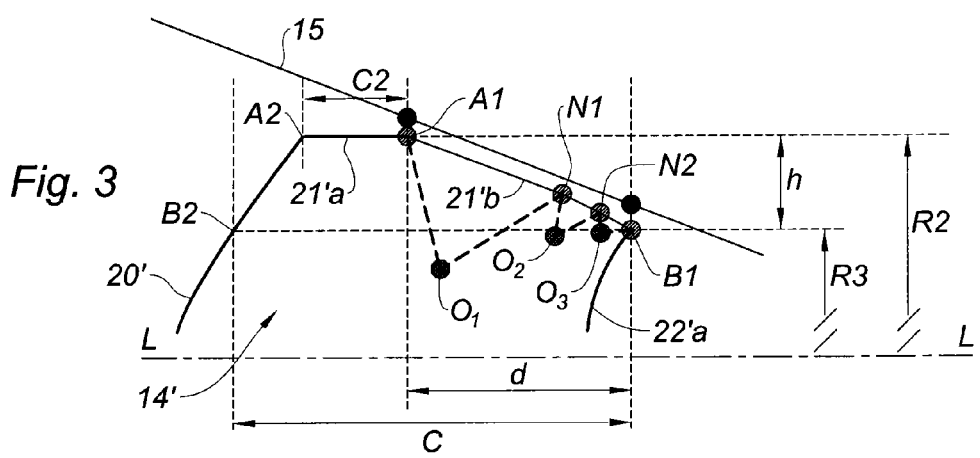
FIG. 3 repeats FIG. 2, giving geometric characteristics of a variant embodiment of a downstream propeller blade of a turboprop engine according to the invention.

It should be noted that, because of the twisting of the blade, giving for each value of the radial dimension an angle of incidence of the profile suited to the flow seen by the blade in rotation, the length of a chord is not its axial extension depicted in FIG. 2 or 3. It is in general larger. However, the angle of the blade with a meridian plane, not shown in the drawings, varies little in the head region. The ratios of the axial extensions and the lengths of the chord between two points in FIGS. 2 and 3 are therefore substantially equal.

The axial extension of the terminal edge 21', between its upstream end A2 and its downstream end B1, is less than the axial extension C of the reference chord in the example presented corresponding to a blade having a deflection towards the downstream end. This axial extension may be greater if, for example, the deflection of the blade is towards the upstream end.

Moreover, the terminal edge is situated inside a space delimited by a cylinder of axis LL corresponding to the maximum radial dimension R2 of the blades of the downstream propeller 14', and the cone of the path 15 of the upstream tip vortex.

The cone of the path 15 of the upstream tip vortex, projected in an axial plane, passes through a point B'1 on the same axial abscissa as the point B1 of the trailing edge at the radial dimension R3 of the downstream end B1 of the terminal edge 21. The radial dimension at this point B'1 has a value less than the maximum dimension R2 of the blades.

As a consequence of what was disclosed above, the radial dimension R3 of the downstream end B1 of the terminal edge 21 is less than or equal to the radial dimension at a point B'1 situated at the same axial abscissa on the cone of the path 15 of the upstream tip vortex. However, in order to minimise the influence of the tip vortex, the diameter of which increases towards the downstream end, the radial dimension R3 of the downstream end B1 preferably takes a value of less than 96% of the radial dimension of the point B'1.

The end A1 between the rectilinear part 21'a and the convergent part 21'b of the terminal edge is situated as far downstream as possible from the upstream end A2 of this terminal edge 21', while remaining within the cone of the path 15 of the upstream tip vortex. The axial extension of the rectilinear part 21'a of the terminal edge therefore has a value C2 equal to at least 10% of the axial extension C of the chord of the blade at the radial dimension R3 of the downstream end B1 of the terminal edge 21'.

In order to minimise interaction with the tip vortex, the upstream end A1 of the convergent part 21'b of the terminal edge is situated at an axial abscissa such that the maximum radial dimension R2 of the blade is less than 99% of the radial dimension of the point A'1 of the same axial abscissa on the cone of the path 15 of the tip vortex. The fringe at the upstream end A1 of the convergent part 21'b of the terminal edge is identical or, advantageously, smaller than at the downstream end B1 since the tip vortex splays towards the downstream end.

In addition, the convergent part 21'b of the terminal edge is entirely within the cone of the path 15 of the upstream tip vortex between its upstream end A1 and its downstream end B1.

It will also be noted in FIG. 2 that the terminal edge 21' comprises a rectilinear upstream part 21'a followed by a convergent downstream part 21'b, the radial distance from the terminal edge 21' to the rotation axis LL being a concave function of the position along the rotation axis LL. In other words, the slope of the tangent of the terminal edge 21' in a meridian plane slopes more and more towards the rotation axis LL going from upstream to downstream. This property is also found in a variant described below.

In one embodiment, depicted in FIG. 3, the curve followed in the axial direction by the convergent part 21'b of the terminal edge is defined by a succession of curves (in FIG. 3 lying successively between the points A1 and N1, N1 and N2, N2 and B1) with decreasing radii of curvature, corresponding to arcs of circles with centres O1, O2, O3 positioned so as to ensure continuity.

A single arc of a circle can be used to define this curve 21'b but, preferably, at least two successive arcs of circles are used in order to come to an optimal compromise between the aerodynamic and acoustic performances.

In general terms, in a preferred embodiment, the centres of curvature of this convergent part 21'b of the terminal edge are always radially on the same internal side, with respect to the terminal edge 21. In the example, it is possible to use as a reference the outline in a meridian plane of a cone tangent to the convergent part 21'b and the centres of curvature are radially inside. Thus the convergent part 21'b of the terminal edge starts from its upstream end A1 while being substantially parallel to the cone of the path 15 of the upstream tip vortex and then moves away from it more and more in order to join its downstream end B1.

In addition, although FIG. 3 gives only a schematic position of the centres of curvature O1, O2, O3, it shows an arrangement where the radius of curvature decreases towards the downstream end, approaching the downstream end B1 of the terminal edge.

According to FIG. 2 or 3, referring to the axial abscissae and the radial dimensions, it is possible to construct a triangle passing through the downstream end B1 of the terminal edge to the radial dimension R3, the point B2 of the leading edge at the same radial dimension R3, and the intersection A1, at the maximum radial dimension R2, of the rectilinear 21'a and convergent 21'b parts of the terminal edge. This triangle has a base corresponding to the chord C of the blades at the radial dimension R3 of the downstream end B1 of the terminal edge 21' and a height h, forming the radial extension of the downstream convergent part 21'b of the terminal edge, equal to the difference R2-R3 between the maximum radial dimensions and the downstream end B1 of the terminal edge 21. In addition, its apex A1 is situated upstream of the downstream end B1 of the terminal edge 21', at an axial distance d, the value of which is constrained by the geometric considerations indicated above. This distance d constitutes the axial extension of the convergent part 21'b of the terminal edge, between its ends A1, B1.

This axial extension d is at least equal to 10% of the axial extension C of the chord at the radial dimension R3 of the downstream end B1 of the terminal edge 21'. However, because of the relatively slight inclination of the paths 15 of the upstream tip vortices with respect to the axis LL, this axial extension d could be at least equal to half of this chord C in a particular embodiment.

For the same reason, the radial extension h of the downstream convergent part 21'$b$ of the terminal edge is generally less than the axial extension C of this chord. This is because the upstream end A1 of the convergent part 21'$b$ of the terminal edge is situated inside said cone and is situated axially between the points B2 of the leading edge and B1 of the trailing edge at the radial dimension R3 of the downstream end B1 of the terminal edge 21.

In particular, for aircraft turboprop engines, the blades are slender. Close to the terminal edge 21' of the blade, the chord is small compared with the radial dimension. This means that the radial dimension R3 of the downstream end B1 of the terminal edge 21' of the blade is close to the maximum radial dimension R2 of the blade. It is in general at least equal to 80% of this maximum dimension.

In an embodiment as depicted in FIG. 2, the trailing edge 22' is inclined towards the downstream end at radial dimensions less than the radial dimension R3 of the downstream end B1 of the terminal edge 21. It therefore starts again from the downstream end B1 of the terminal edge 21', extending towards the upstream end when the radial dimension decreases. This creates a sharp break in orientation of the trailing edge 22' and of the terminal edge 21' at this downstream end B1.

It can be envisaged applying the invention to a configuration where the trailing edge 22' of the blades of the downstream propeller 14' extends towards the downstream end when the radial dimension decreases starting from the downstream end B1 of the terminal edge 21'.

In this case, in consideration of the specific application to turboprop engines with contra-rotating propellers, a break in orientation of the trailing edge 22' and of the terminal edge 21' at this downstream end B1 is in general also found. This is because generally the trailing edge 22' close to this end B1 has an inclination with respect to the axis LL greater than 45° whereas the mean inclination of the convergent part 21'$b$ of the terminal edge between its ends A1, B1 is appreciably less than 45°.

In a second variant of the method that has been described, in order to end up with these shapes, the maximum radial dimension R0 of the downstream propeller initially designed according to the prior art is such that the radial end of the leading edge of this downstream propeller is outside said cone of the path 15 of the upstream tip vortex.

In this case, the invention may be combined with the clipping method. In a preliminary step, according to the clipping method, the radial dimension of the blade of the propeller is reduced by a sufficient value for the leading edge to remain inside the cone of the path 15 of the upstream tip vortex but limited so that the radial end of the trailing edge is outside said cone, so as not to eliminate too much wetted surface on the blade. This propeller has the same shape as the propeller initially designed up to this new maximum radial dimension R2.

The steps of the method are then the same as in the first variant using the blades that have undergone clipping as blades of the reference propeller 14.

Thus such a method makes it possible to minimise the losses in the aerodynamic performances caused by reducing the wetted surface, in particular by limiting the clipping, while ensuring that the tip vortex issuing from the upstream propeller is avoided.

According to the geometry in question, it is possible to end up with a reduction in clipping of 3% or 4%, that is to say an approximate gain of approximately 1.5% on the overall propulsive efficiency, at the operating speed for which the power unit must satisfy the strictest noise standards.

The invention claimed is:

1. An aircraft turboprop engine comprising two unducted propellers, coaxial about a rotation axis, respectively upstream and downstream, each propeller comprising an annular row of blades, the blades of the downstream propeller each having a truncated head and each comprising a leading edge and a trailing edge, the radially external ends of which are distant from each other and are connected by a terminal edge, in which the terminal edge of each blade of the downstream propeller has, at at least two points, tangents in a meridian plane having different slopes, the upstream end of the terminal edge defining a maximum radial dimension of the blade and its downstream end defining a minimum radial dimension of said terminal edge, wherein each blade of the downstream propeller is situated inside a cone converging towards the downstream end, which meets the terminal edges of the blades of the upstream propeller and the radial dimension of which in the transverse plane passing through the downstream end of the terminal edge is less than the maximum radial dimension of said blade of the downstream propeller.

2. The turboprop engine according to claim 1, wherein the radial distance from the terminal edge to the rotation axis is a concave function of the position along the rotation axis.

3. The turboprop engine according to claim 2, wherein the terminal edge comprises a substantially rectilinear upstream part defining the maximum radial dimension of the blade.

4. The turboprop engine according to claim 1, wherein the terminal edge comprises a downstream part inclined from upstream to downstream radially towards the inside, the axial extension of this downstream part being at least equal to 10% of the axial extension of the reference chord of the blade at the downstream end of the terminal edge.

5. The turboprop engine according to claim 4, wherein a the radial extension of the terminal edge is no more than 20% of the maximum radial dimension of the blade.

6. The turboprop engine according to claim 4, wherein the downstream part of the terminal edge comprises at least one portion with a rounded shape and the centres of curvature of which are arranged so that the downstream part curves more and more towards the rotation axis going towards the downstream end of the terminal edge.

7. The turboprop engine according to claim 6, wherein the downstream part of the terminal edge comprises a plurality of successive portions with a rounded shape and the centres of curvature of which are arranged so that the downstream part curves more and more towards the rotation axis going towards the downstream end of the terminal edge.

8. The turboprop engine according to claim 6, wherein the portion or portions have radii of curvature that decrease going from upstream to downstream.

9. The turboprop engine according to claim 1, in which the trailing edge of the blades of the downstream propeller extend, at least close to its radial end, from upstream to downstream radially towards the outside.

10. The turboprop engine according to claim 1, in which the leading edge of the blades of the downstream propeller extend, at least close to its radial end, from upstream to downstream radially towards the outside.

11. A method for producing a downstream propeller of an aircraft turboprop engine according to claim 1, comprising:
 a step consisting in designing blades for a reference downstream propeller, each blade having a truncated head and comprising a leading edge and a trailing edge, radially external ends of which are distant from each other and are connected by a substantially rectilinear terminal edge, having a radial dimension substantially equal to the maximum radial dimension of the blades of the downstream propeller to be produced; and a step of trimming the downstream and radially external end of each of said blades for a reference downstream propeller.

* * * * *